T. F. I. O'BRIEN.
ROTARY ENGINE.
APPLICATION FILED SEPT. 13, 1915.
1,223,721.
Patented Apr. 24, 1917.
2 SHEETS—SHEET 1.
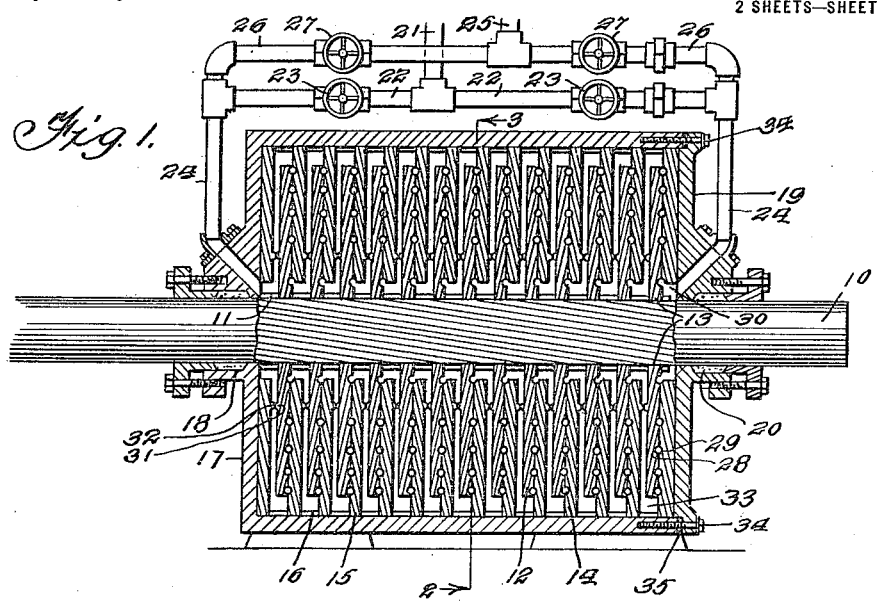
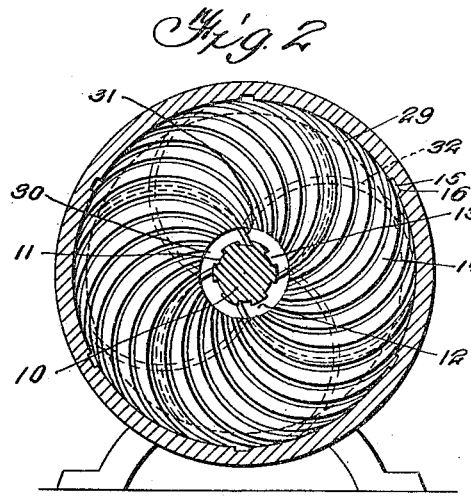 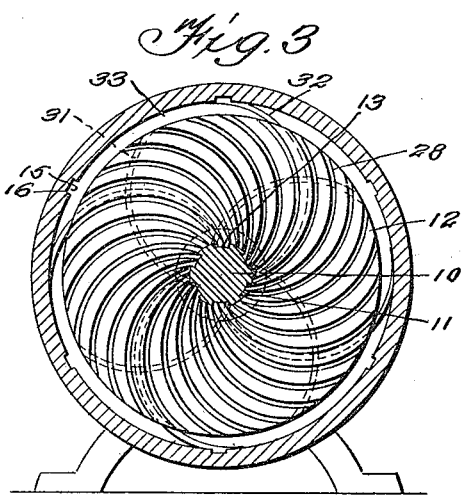
Inventor
Thomas F. I. O'Brien,

T. F. I. O'BRIEN.
ROTARY ENGINE.
APPLICATION FILED SEPT. 13, 1915.

1,223,721.

Patented Apr. 24, 1917.
2 SHEETS—SHEET 2.

Witnesses
Geo. L. Thorn
Mae Perry

Inventor
Thomas F. I. O'Brien
By Mason Fenwick Lawrence,
Attorneys

UNITED STATES PATENT OFFICE.

THOMAS F. I. O'BRIEN, OF NEW YORK, N. Y.

ROTARY ENGINE.

1,223,721.     Specification of Letters Patent.     Patented Apr. 24, 1917.

Application filed September 13, 1915. Serial No. 50,480.

*To all whom it may concern:*

Be it known that I, THOMAS F. I. O'BRIEN, a citizen of the United States, residing at New York, in the county of New York and State of New York, have invented certain new and useful Improvements in Rotary Engines; and I do hereby declare the following to be a full, clear, and exact description of the invention, such as will enable others skilled in the art to which it appertains to make and use the same.

This invention relates to rotary engines and more particularly to that type wherein expansion of a compressed gas or vapor may be utilized.

It has for an object to provide a rotor having a plurality of movable faces which are imposed upon a corresponding number of stationary faces and the contiguous faces of said stationary and rotating parts having grooves or ribs formed therein or thereon, of which said grooves or ribs in one face cross the grooves or ribs in the contiguous face, said grooves or ribs forming channels affording passages for fluids or gases under pressure and in which the resultant force of opposing currents imparts motion to the rotor.

A further object of this invention is the provision of a multi-stage impeller in which the expansion of gases or vapors may be utilized in imparting motion to a rotor.

A further object of this invention is the provision of a plurality of sections forming rotating and stationary portions and provisions for taking up the wear of the several parts incident to friction or otherwise.

A further object of this invention is the provision of assembling a plurality of sections in a stationary frame and upon a rotating shaft to permit movement thereof to maintain the desired contacting relation between the several parts.

A further object of this invention is to provide a moving surface and a stationary surface imposed thereon, and to have said surfaces grooved or ribbed so that the grooves or ribs of one surface cross those of the other forming passages for fluids or gases under pressure to utilize the resultant force from the meeting of the currents of gases or vapors through said passages as said currents tend to oppose or deflect one another at points of intersection.

Further objects will be apparent from the following specification, appended claims and drawings in which—

Figure 4:
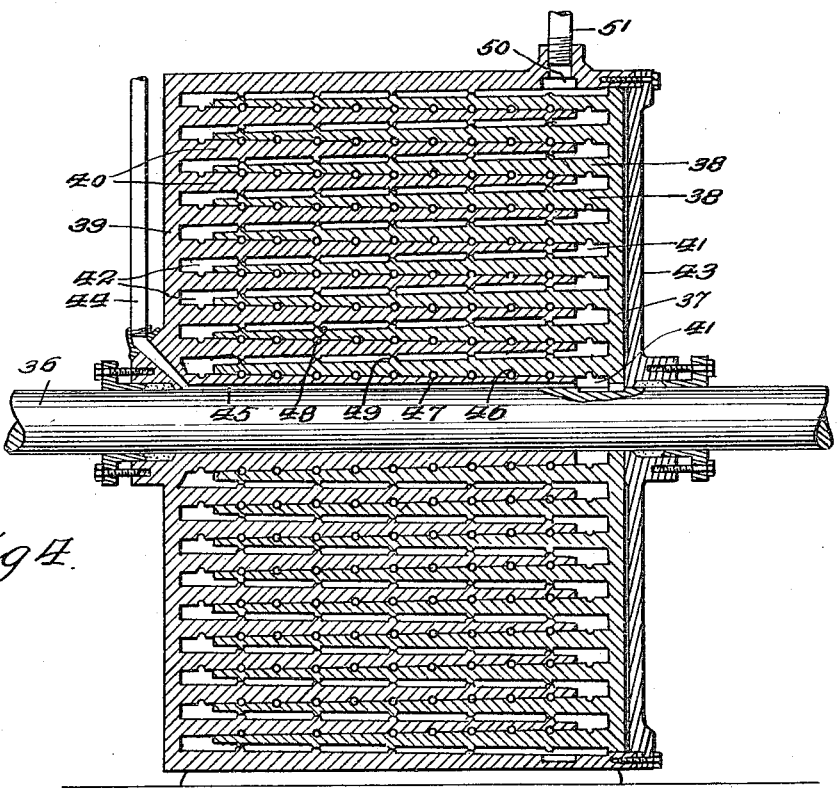
Figure 5:
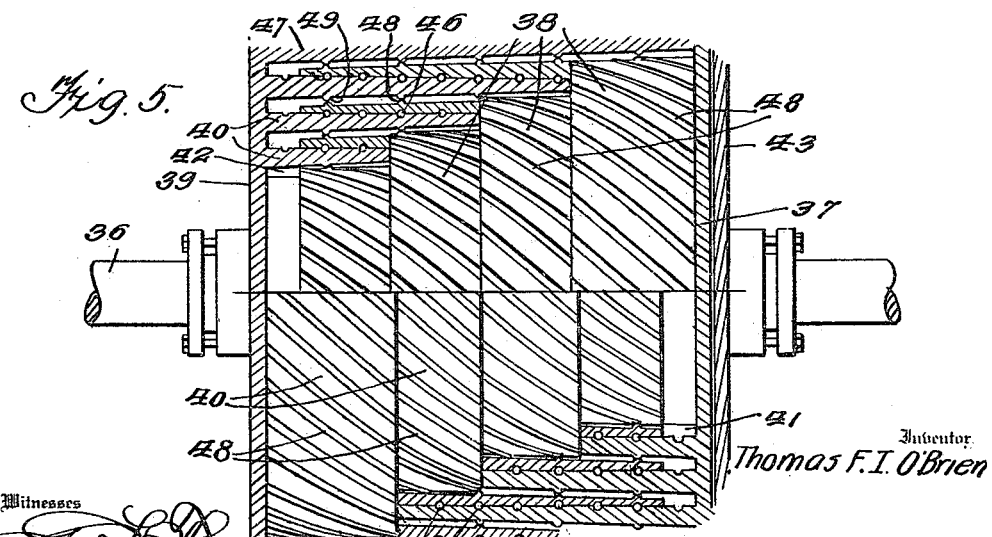

Figure 1 is a vertical sectional view through one type of unit constructed in accordance with this invention, Figs. 2 and 3 are cross sectional views therethrough as on the line 2—3, looking in opposite directions as indicated by the arrows, Fig. 4 is a vertical sectional view through another type of engine of a tubular formation, and Fig. 5 is a fragmentary elevation and sectional view through the type shown in Fig. 4.

In carrying out this invention, the rotor is driven by a force which is the result of the opposition or deflection of converging forces established by the passage of fluids, gases or vapors through predetermined courses; and by the multiplication of the number of independent surfaces formed by a stationary frame and rotating frame, making it possible to utilize the expansion of a vapor or gas under pressure in imparting motion to the rotor.

Referring to the drawings, there is shown a shaft 10 which may be slotted at intervals as shown at 11 and upon this shaft is a series of disks 12 which may have inwardly projecting lugs 13 to engage the slots 11. These disks are slidable on the shaft 10 but are positively connected thereto to impart motion to said shaft as said disks are rotated. Between the disks 12 are disks 14 which have the outwardly extending lugs 15 to engage in slots 16 formed in the casing 17 upon one end of which is formed the stuffing box 18 through which the shaft 10 extends. The opposite end of the casing 17 is provided with a head 19 which is likewise provided with a stuffing box 20.

A supply pipe 21 has the branches 22 connected thereto and each branch has a valve 23 therein to control the passage of fluid or other pressure from the supply pipe to the branches 24 and from these branches to the interior of the casing 17 as shown. The branches 24 also connect to an exhaust pipe 25 through the branches 26 in which the valves 27 are placed. With this arrangement, it is seen that by the proper manipulation of the valves 23 and 27, fluid or other pressure may be admitted at either end of the housing 17 and the opposite end thereof may be connected with the exhaust pipe to thereby permit rotation of the impeller in either direction.

One face of each of the disks 12 is provided with grooves 28 and the contiguous disk 14 is grooved as at 29 in having these grooves 28 and 29 so formed in the faces of the disks 12 and 14 that when these disks are brought into bearing relation, the grooves 28 and 29 are disposed to cross each other and when pressure is admitted within the chamber 30 formed in the central portion of the disks 14, it escapes through the grooves 28 and 29. As these motive currents pass through the grooves 28 and 29, the lines of force which intersect at the crossing of the grooves set up an opposing or deflecting resultant force which imparts motion to the rotor.

The face of each of the disks 12 has a plurality of ribs 31 formed thereon. The contiguous face of the adjacent disk 14 is likewise provided with the ribs 32 which are formed obliquely to the ribs 31. It is seen that a free passage of motive fluid from the outer chamber 33 to the central chamber 30 is formed. When in use, the wear upon the several disks 12 and 14 may be taken care of by tightening the bolts 34 and if necessary, by the substitution of a different gasket 35 between the casing 17 and the head 19.

Fig. 4 shows a sectional view of a plurality of faces formed on cylinders which are concentric and slightly tapered toward the open ends to permit longitudinal movement of some of said faces with respect to others to provide the necessary take-up to overcome the wear. In this type, there is shown a shaft 36 which has the rotor 37 carried thereby and this rotor comprises a plurality of tubes 38 which are shown as having tapering faces. A housing 39 surrounds the rotor and this housing is provided with a plurality of tubes 40 which enter the spaces between the tubes 38. The tubes 38 and 40 do not completely fill the intervening spaces therebetween, but form the passages 41 and 42 for the reception of the motive fluid after having passed between the tubes. The casing 39 is provided with an adjustable head 43 by which longitudinal movement of the rotor 37 with respect to the casing 39 may be had. A pressure supply pipe 44 admits motive fluid or other pressure to the passage 45 from where it enters the innermost annular chamber 41 and from where it passes through grooves 46 formed in the inner walls of the tubes 38 and the grooves 47 formed in the outer walls of the tube 40 to the innermost chamber 42. From the innermost chamber 42, the motive fluid passes through the channels formed on the outer wall of the tube 38 as by ribs 48 and the channels formed on the inner walls of the tubes 40 by the ribs 49 back to one or another of the annular chambers 41. The grooves 46 and 47, and ribs 48 and 49 are formed in or on their respective surfaces in such a manner as to have the grooves 46 and 47 obliquely inclined to one another so that the resultant force established by the passage of motive fluid therethrough will drive the impeller in the desired direction and the corresponding ribs 48 and 49 will be reversed to also impart a corresponding motion to the outer surface of the tube 38. It is understood that each of the tubes of the series 38 and 40 will have corresponding grooves or channels formed therein, and that these grooves will be similar in the corresponding surfaces.

As shown in Fig. 1, the impeller is disposed between stationary faces to avoid end thrust incident to the fluid under pressure.

It is thought that the operation of this device is apparent in view of the foregoing and that further description thereof is unnecessary.

Also, various modifications may be made within the scope of the appended claims without departing from the spirit of this invention and the drawings submitted herewith are for illustrative purposes only.

Having thus described my invention I claim:—

1. In an engine of the class described, a stationary frame and a rotor journaled therein, a plurality of contacting faces carried by said frame and rotor, some of said faces in the stationary and rotating faces having grooves formed therein which in the contiguous faces are obliquely inclined to each other, others of said faces having ribs formed thereon which in the contiguous faces are obliquely inclined, and said ribs forming passages between some of said faces connecting the grooves of one pair of contiguous faces to those of the succeeding pair of contiguous faces.

2. In an engine of the class described, a plurality of stationary partitions and a plurality of movable partitions disposed between said stationary partitions, the faces of said partitions having channels formed thereon by grooves in one face of each partition and ribs formed on the opposite face and said channels in the contiguous faces of the stationary and movable partitions crossing each other.

3. In an engine of the class described, a plurality of stationary partitions, and a corresponding number of rotatable partitions between the stationary ones, contact faces formed on said partitions, said faces having channels formed therein, which oppose each other in the contiguous faces, said channels being formed on one face of each partition by having said face ribbed and on the opposite face of each partition by having said face grooved, and the channels of each contiguous pair of faces communicating with those on the next adjacent pair of faces to direct a motive fluid through the channels formed in said faces in opposite directions in the consecutive faces.

In testimony whereof I affix my signature.

THOMAS F. I. O'BRIEN.